US009110222B2

United States Patent
Kanayama (10) Patent No.: US 9,110,222 B2
(45) Date of Patent: Aug. 18, 2015

(54) IMAGE PICKUP SYSTEM (71) Applicant: CANON KABUSHIKI KAISHA, Tokyo (JP)

(72) Inventor: Masaomi Kanayama, Saitama (JP)

(73) Assignee: CANON KABUSHIKI KAISHA (JP)

( * ) Notice: Subject to any disclaimer, the term of this patent is extended or adjusted under 35 U.S.C. 154(b) by 62 days.

(21) Appl. No.: 13/899,981

(22) Filed: May 22, 2013

(65) Prior Publication Data
US 2013/0314808 A1 Nov. 28, 2013

(30) Foreign Application Priority Data

May 22, 2012 (JP) .................................. 2012-116448

(51) Int. Cl.
G02B 7/02 (2006.01)
H04N 13/02 (2006.01)
G02B 7/04 (2006.01)
G02B 7/10 (2006.01)

(52) U.S. Cl.
CPC *G02B 7/04* (2013.01); *G02B 7/102* (2013.01); *H04N 13/0239* (2013.01); *H04N 13/0296* (2013.01)

(58) Field of Classification Search
CPC ............. G02B 7/04; G02B 7/10; G02B 7/102
USPC ............................................ 359/823; 348/47
See application file for complete search history.

(56) References Cited

U.S. PATENT DOCUMENTS

| 2012/0026605 A1 | 2/2012 | Kato |
| 2012/0051728 A1 | 3/2012 | Kanayama |
| 2014/0168383 A1* | 6/2014 | Murakami ....................... 348/47 |

FOREIGN PATENT DOCUMENTS

| EP | 2420888 A2 | 2/2012 |
| JP | 09-127400 A | 5/1997 |
| JP | 09133852 A | 5/1997 |

OTHER PUBLICATIONS

Extended European Search Report issued in EP13002549.7 mailed Oct. 7, 2014.

* cited by examiner

Primary Examiner — William Choi
(74) Attorney, Agent, or Firm — Rossi, Kimms & McDowell LLP (57) ABSTRACT An image pickup system includes two lens apparatuses each including a movable optical member, a driving unit that drives the movable optical member, and a driving signal generating unit that generates a driving signal for causing the driving unit to drive the movable optical member, a command signal generating unit that generates a command signal to command driving of the movable optical member, a posture determining unit that determines the posture of each lens apparatus, and a master-slave setting unit that sets each lens apparatus, based on the determined posture of the lens apparatus, as one of a master lens apparatus in which the driving signal generating unit generates the driving signal based on the command signal and a slave lens apparatus in which the driving signal generating unit generates the driving signal based on the position of the movable optical member in the other lens apparatus.

11 Claims, 6 Drawing Sheets

IMAGE PICKUP SYSTEM

BACKGROUND OF THE INVENTION

1. Field of the Invention

The present invention relates to an image pickup system and, more particularly, to an image pickup system that picks up an image using two lens apparatuses.

2. Description of the Related Art

Figure 8:
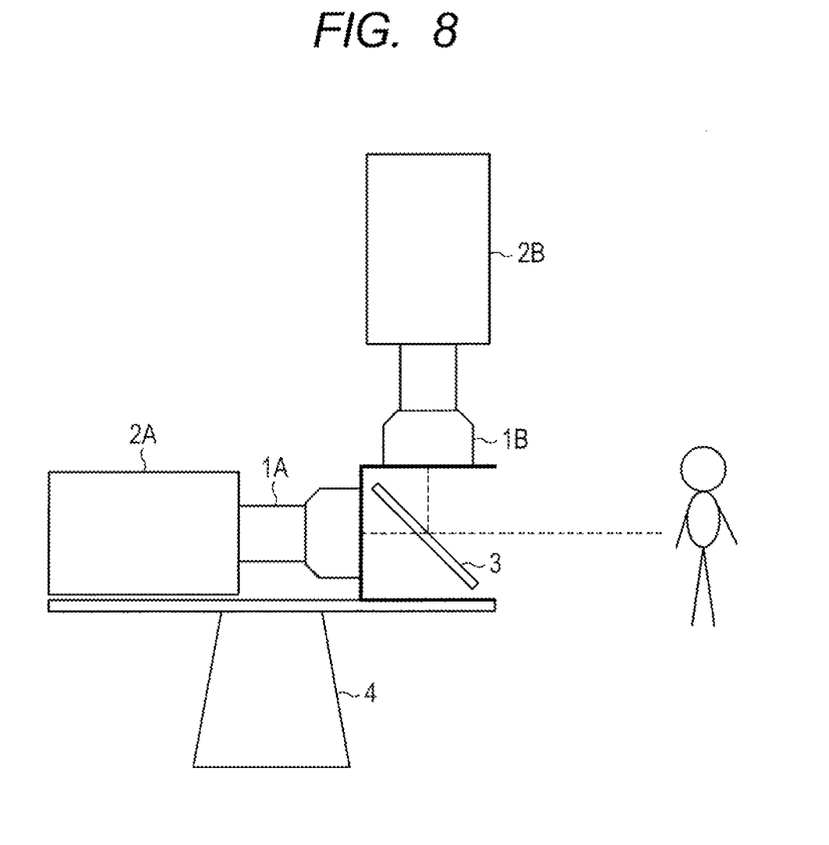
FIG. 8 is a view showing the outer appearance of a 3D image pickup system according to a related art.

There is conventionally developed an image pickup system in which two image pickup apparatuses are juxtaposed, and parallax images for right and left eyes are picked up, thereby acquiring a 3D image. The image pickup is performed basically by setting the distance between the image pickup apparatuses for right and left eyes to approximately 65 mm (equivalent to the interpupillary distance). In some cases, however, the image pickup apparatuses cannot be arranged at the desired distance because of an influence of the shape or size of the image pickup apparatus. Against this backdrop, an image pickup system has been developed which performs image pickup by arranging image pickup apparatuses above and behind a half mirror. FIG. 8 is a view showing the outer appearance of the image pickup system. FIG. 8 is a side view. The image pickup system includes lens apparatuses 1A and 1B of the same specifications, cameras 2A and 2B of the same specifications, a half mirror 3, and a camera platform 4 supporting these components. The lens apparatus 1A and the camera 2A are arranged in the horizontal state. A light beam from an object passes through the half mirror 3 and enters the camera 2A through the lens apparatus 1A. The lens apparatus 1B and the camera 2B are arranged in the vertical state. A light beam from an object is reflected by the half mirror 3 and enters the camera 2B through the lens apparatus 1B. For example, the lens apparatus 1A and the camera 2A are used to pick up a right eye image, and the lens apparatus 1B and the camera 2B are used to pick up a left eye image. Such vertical arrangement allows to flexibly adjust the distance between the two image pickup apparatuses on the half mirror surface without any influence of the shape or size of the image pickup apparatus itself.

Additionally, in the two lens apparatuses used in the 3D image pickup system, synchronization control of movable optical members such as a magnification-varying mechanism, a focus adjustment mechanism, and an image stabilization mechanism is performed such that the optical conditions always match each other.

For example, Japanese Patent Application Laid-Open No. H09-127400 discloses a driving apparatus that drives, out of a pair of zoom lenses arranged on the left and right sides, a first zoom lens by operating a zoom switch, and on the other hand, drives a second zoom lens such that its photographing magnification matches that of the first zoom lens. A lens apparatus that drives a movable optical member based on a command signal by an operating member such as a zoom switch is defined as a master lens apparatus. A lens apparatus that drives a movable optical member of its own based on the position of the movable optical member on the master side is defined as a slave lens apparatus.

In the related art disclosed in Japanese Patent Application Laid-Open No. H09-127400, the left and right lens apparatuses can be synchronized for the focal length after the stop of driving. However, they cannot accurately be synchronized during driving. In particular, as described above concerning the related art, when an image pickup system that uses a half mirror and vertically arranges a lens apparatus is employed, the left and right lens apparatuses are set in the horizontal state and the vertical state, respectively, and therefore have different driving characteristics. For example, in the lens apparatus installed in the vertical state, the moving direction of the movable optical member matches the direction of gravity. For this reason, when driving the movable optical member in a direction opposite to the direction of gravity, the load increases, and the driving speed decreases. Hence, when the lens apparatus in the horizontal state is set as the master, and the lens apparatus in the vertical state is set as the slave, a shift is generated between the positions of the movable optical members during driving because the driving speed of the slave is lower than that of the master. A 3D image picked up in this state is very difficult to view and produces fatigue on the observer.

Additionally, in Japanese Patent Application Laid-Open No. H09-127400 described above, the master lens apparatus and the slave lens apparatus are uniquely decided. It is therefore impossible to flexibly change the master-slave relationship based on driving conditions such as a posture, a driving direction, and a driving characteristic unique to a lens.

SUMMARY OF THE INVENTION

The present invention provides a 3D image pickup system that uses two lens apparatuses each including a movable optical member and is capable of accurately synchronously driving the movable optical members of both lens apparatuses.

According to the present invention, there is provided an image pickup system including two lens apparatuses each including a movable optical member, a driving unit that drives the movable optical member, and a driving signal generating unit that generates a driving signal for causing the driving unit to drive the movable optical member, a command signal generating unit that generates a command signal to command driving of the movable optical member, a posture determining unit that determines a posture of each of the two lens apparatuses, and a master-slave setting unit that sets each of the lens apparatuses, based on the posture determined by the posture determining unit, as one of a master lens apparatus in which the driving signal generating unit generates the driving signal based on the command signal and a slave lens apparatus in which the driving signal generating unit generates the driving signal based on a position of the movable optical member in the other lens apparatus.

According to the present invention, it is possible to provide a 3D image pickup system that uses two lens apparatuses each including a movable optical member and is capable of accurately synchronously driving the movable optical members of both lens apparatuses.

Further features of the present invention will become apparent from the following description of exemplary embodiments with reference to the attached drawings.

DESCRIPTION OF THE EMBODIMENTS

Figure 1:
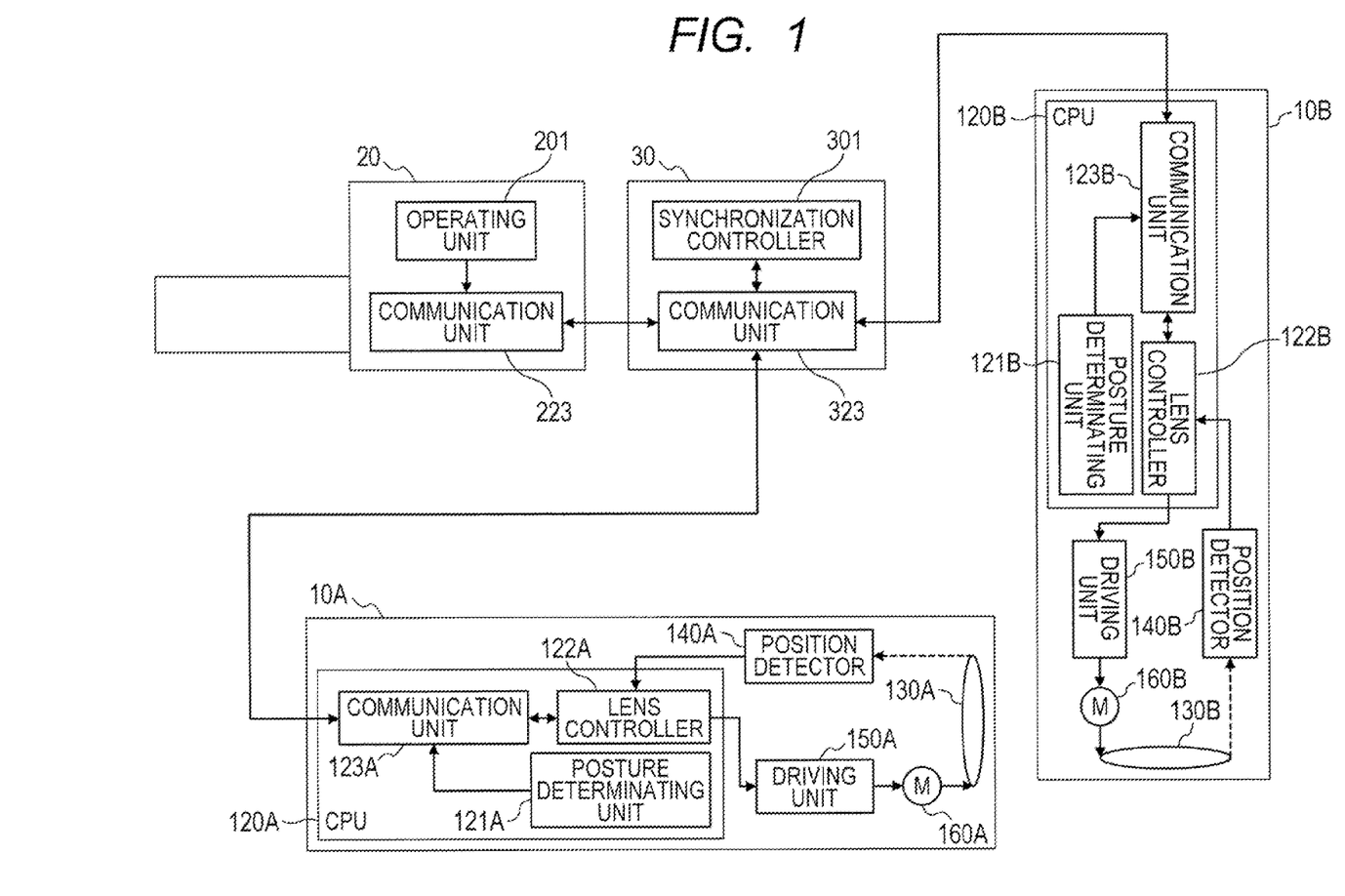
FIG. 1 is a block diagram showing the arrangement of an image pickup system according to the first embodiment of the present invention.

Preferred embodiments of the present invention will now be described in detail with reference to the accompanying drawings. FIG. 1 is a block diagram showing the arrangement of an image pickup system according to an embodiment of the present invention.

First Embodiment

An image pickup system according to the first embodiment of the present invention will be described below with reference to FIGS. 1 to 3.

FIG. 1 is a block diagram showing the arrangement of zoom lens units respectively mounted on a lens apparatus in the horizontal state and a lens apparatus in the vertical state.

The image pickup system shown in FIG. 1 includes two lens apparatuses of a zoom lens unit 10A in the horizontal state and a zoom lens unit 10B in the vertical state, a zoom operating member 20, and a relay box 30. In this embodiment, lens apparatuses of the same specifications are used as the lens apparatus in the horizontal state and that in the vertical state. For this reason, the zoom lens units 10A and 10B also include the same constituent elements. The same reference numerals denote the same constituent elements. The constituent elements of the zoom lens unit 10A have reference numerals ending in A, and the constituent elements of the zoom lens unit 10B have reference numerals ending in B. The zoom lens unit 10A will be exemplified below.

The zoom lens units 10A and 10B, the zoom operating member 20, and the relay box 30 include communication units 123A, 123B, 223, and 323, respectively. The communication units are connected to each other by serial communication.

A CPU 120A is included in the zoom lens unit 10A. The CPU 120A includes a posture determining unit 121A, a lens controller 122A serving as a driving signal generating unit, and the communication unit 123A serving as a command signal acquisition unit. The posture determining unit 121A is formed from, for example, an acceleration sensor. The acceleration sensor is a sensor that converts an acceleration into an electrical signal. The acceleration sensor detects a gravitational acceleration applied to it in a motionless state, thereby determining whether the zoom lens unit 10A is in the horizontal state or vertical state. The lens controller 122A generates a driving signal based on a command signal received via the communication unit 123A. A zoom lens 130A serving as a movable optical member is moved in the optical axis direction by a cam mechanism (not shown) to perform a magnification-varying operation. A position detector 140A detects the position of the zoom lens 130A. A driving unit 150A operates a motor 160A based on the driving signal from the lens controller 122A and drives the zoom lens 130A.

The magnification-varying operation of the zoom lens unit 10A is performed by the above-described arrangement.

The constituent elements of the zoom lens unit 10B are the same as those of the zoom lens unit 10A, and a description thereof will be omitted.

The zoom operating member 20 serving as an operating apparatus is formed from an operating unit 201 and the communication unit 223. The operating unit 201 serving as a command signal generating unit is operated by the user, generates a command signal based on the operating amount of the operating unit 201, and transmits the command signal via the communication unit 223.

The relay box 30 serving as a connection apparatus is a controller that controls the two lens apparatuses including movable optical members, and is formed from a synchronization controller 301 and the communication unit 323. The synchronization controller 301 serving as a master-slave setting unit acquires postures from the posture determining units 121A and 121B of the zoom lens units 10A and 10B via the communication unit 323. The synchronization controller 301 sets each of the zoom lens units 10A and 10B as a master zoom lens unit (master lens apparatus) or a slave zoom lens unit (slave lens apparatus) based on the acquired postures. The master and slave setting processes will be described later. The synchronization controller 301 also transmits a command signal to each of the zoom lens units 10A and 10B via the communication unit 323. Details of the command signal transmission process will be described later.

In this embodiment, the arrangement that determines the posture based on the output of the acceleration sensor has been described. However, the present invention is not limited to this. For example, the zoom lens or focus lens may be driven, and the direction of gravity may be judged based on the operating current value at the time of driving to determine the posture.

Alternatively, a setting unit for setting a posture may be provided, and the user may manually input the horizontal state or vertical state.

Figure 2:
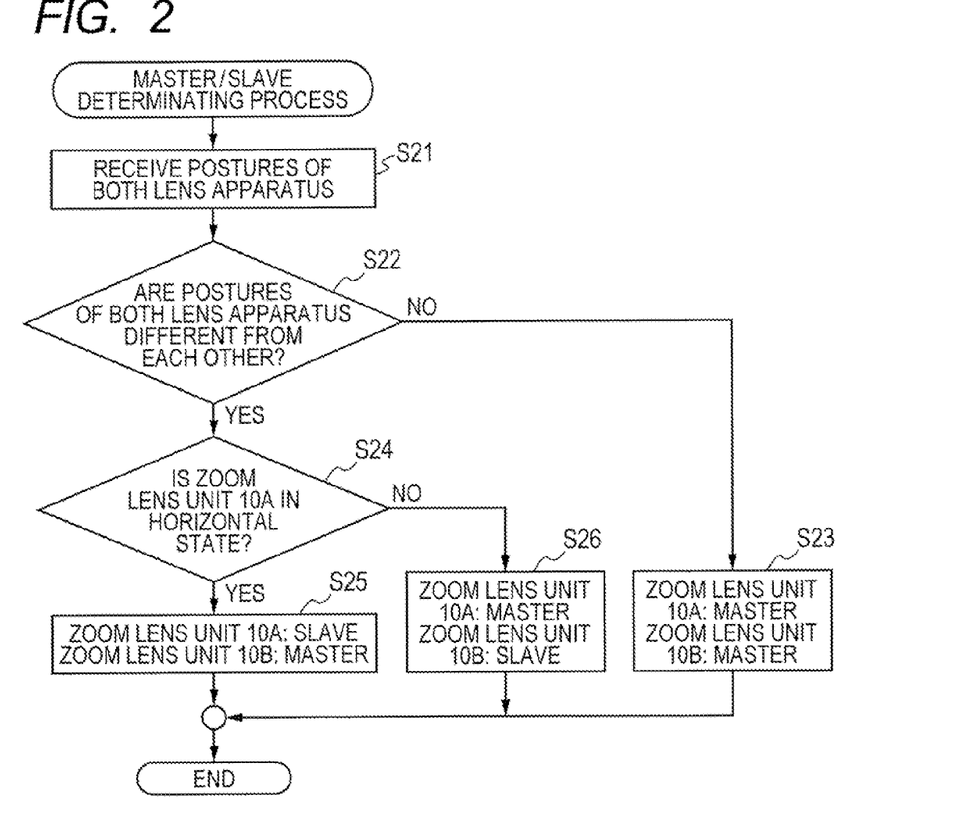
FIG. 2 is a flowchart showing the procedure of a master/slave determining process according to the first embodiment.

FIG. 2 is a flowchart showing the process of causing the synchronization controller 301 to set the zoom lens units 10A and 10B as the master zoom lens unit and the slave zoom lens unit.

When driving the zoom lens unit in the vertical state in a direction opposite to the direction of gravity, the driving speed decreases as compared to the zoom lens unit in the horizontal state. An example will be described in which the zoom lens unit in the vertical state is set as the master zoom lens unit to maintain synchronous driving even when the driving of the zoom lens unit in the vertical state slows down.

When power is supplied to the relay box, the process advances to step S21 to receive postures determined by the posture determining units 121A and 121B from both the zoom lens units 10A and 10B. In step S22, it is judged whether the postures of both lens apparatuses received in step S21 are different from each other. If the postures are different, the process advances to step S24. If the postures are the same, the process advances to step S23. In step S23, both the zoom lens units 10A and 10B are set as the master zoom lens units. In step S24, it is judged whether the zoom lens unit 10A is in the horizontal state. If the zoom lens unit 10A is in the horizontal state, the process advances to step S25. If the zoom lens unit 10A is in the vertical state, the process advances to step S26. In step S25, the zoom lens unit 10A is set as the slave zoom lens unit because it is in the horizontal state, and the zoom lens unit 10B is set as the master zoom lens unit because it is in the vertical state. In step S26, the zoom lens unit 10A is set as the master zoom lens unit because it is in the vertical state, and the zoom lens unit 10B is set as the slave zoom lens unit because it is in the horizontal state, opposite to step S25.

The zoom lens unit 10B in the vertical state whose driving speed decreases because of an increase in the driving load depending on the driving direction is thus set as the master zoom lens unit.

In this embodiment, an example has been described in which when both the zoom lens units 10A and 10B have the same posture, both are set as the master zoom lens units because there is no difference in the driving characteristic caused by different postures. When both zoom lens units are set as the master zoom lens units, the zoom lenses 130A and 130B are individually driven based on a command signal from the zoom operating member 20. However, the present invention is not limited to this. An arbitrary zoom lens unit may be set as the master zoom lens unit, and the other zoom lens unit may be set as the slave zoom lens unit.

Figure 3:
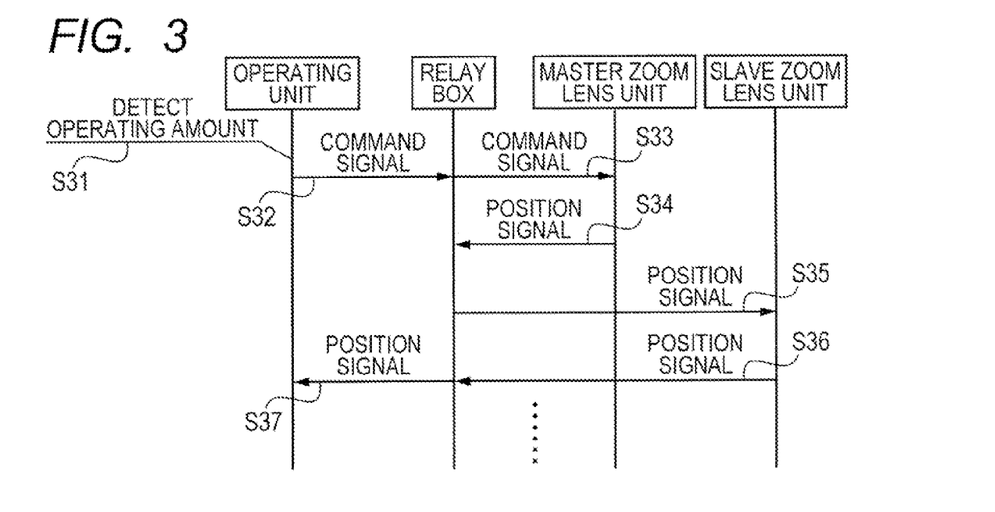
FIG. 3 is a sequence chart showing the procedure of a command signal communication process according to the first embodiment.

FIG. 3 is a sequence chart showing a communication process of a command signal for instructing driving of the zoom lenses 130A and 130B in the zoom lens units 10A and 10B.

In step S31, the operating amount of the operating unit 201 included in the zoom operating member 20 by a user operation is detected, and a command signal is generated based on the operating amount. In step S32, the operating unit 201 transmits the command signal generated in step S31 to the relay box 30 via the communication unit 223. In step S33, the synchronization controller 301 included in the relay box 30 transmits the command signal received in step S32 to the zoom lens unit 10B serving as the master zoom lens unit. Upon reeving the command signal, a lens controller 122B included in the zoom lens unit 10B generates a driving signal based on the command signal and outputs it to a driving unit 150B. The zoom lens 130B of the master zoom lens unit is thus driven to perform the magnification-varying operation. The command signal transmitted from the zoom operating member 20 to the relay box 30 and the command signal transmitted from the relay box 30 to the zoom lens unit 10B can be either a position command signal for commanding a position or a speed command signal for commanding a speed.

In step S34, the zoom lens unit 10B serving as the master zoom lens unit transmits the position signal of the zoom lens 130B detected by a position detector 140B to the relay box 30. In step S35, the synchronization controller 301 transmits the position signal of the zoom lens 130B of the master zoom lens unit received in step S34 to the zoom lens unit 10A serving as the slave zoom lens unit as a command signal. Upon receiving the command signal as a position signal, the zoom lens unit 10A generates a driving signal based on the command signal and outputs it to the driving unit 150A. The zoom lens 130A of the slave zoom lens unit is thus driven to perform the magnification-varying operation. In step S36, the zoom lens unit 10A serving as the slave zoom lens unit transmits the position signal of the zoom lens 130A detected by the position detector 140A to the relay box 30. In step S37, the synchronization controller 301 transmits the position signal received in step S36 to the zoom operating member 20.

The process from step S31 to step S37 is periodically repetitively performed.

As described above, the zoom lens unit 10B serving as the master zoom lens unit performs the magnification-varying operation based on the command signal transmitted from the zoom operating member 20, and the zoom lens unit 10A serving as the slave zoom lens unit performs the magnification-varying operation based on the position of the zoom lens 130B of the master zoom lens unit, thereby performing synchronous driving. Hence, even when the zoom lens unit 10B is in the vertical state, and the driving speed decreases due to the gravity, synchronization can be maintained even during driving by setting the zoom lens unit 10A in the horizontal state as the slave zoom lens unit and causing it to follow the zoom lens unit 10B serving as the master zoom lens unit in the vertical state.

The relay box 30 serving as the controller that controls the two lens apparatuses each including a movable optical member includes the synchronization controller 301 serving as the command signal generating unit that generates a command signal for the zoom lens 130A or 130B serving as the movable optical member of one lens apparatus in accordance with the postures of the lens apparatuses (zoom lens units 10A and 10B). Based on the position of the movable optical member in one lens apparatus, the synchronization controller 301 serving as the command signal generating unit generates a command signal for the zoom lens of the other lens apparatus out of the two lens apparatuses.

When the zoom lens 130B of the zoom lens unit 10B in the vertical state is driven in the forward direction with respect to the direction of gravity, the driving load to drive the zoom lens 130B decreases, and the driving speed therefore tends to increase. When the upper limit value of the driving speed is set in consideration of the driving characteristic of the zoom lens arranged in the horizontal state, the zoom lens 130A in the horizontal state can be prevented from being unable to follow the driving speed of the zoom lens 130B in the vertical state.

In this embodiment, the zoom lens that performs the magnification-varying operation as a movable optical member has been described. However, the movable optical member is not limited to this and may be, for example, a focus lens that performs a focus adjustment operation or an aperture adjustment mechanism.

If a plurality of movable optical members is included, the master or slave may be set for each movable optical member.

In this embodiment, an example has been described in which the synchronization controller 301 is included in the relay box 30 that relays connection between the zoom operating member 20 and the zoom lens units 10A and 10B. However, the present invention is not limited to this. For example, the synchronization controller 301 may be included in the zoom operating member 20 or one of the zoom lens units 10A and 10B.

In this embodiment, an example has been described in which the lens apparatus in the vertical state has a posture directed vertically downward. However, the present invention is not limited to this, and the lens apparatus may have a posture directed vertically upward. In addition, lens apparatuses whose optical axis directions are set in the vertical direction and horizontal direction have been exemplified. However, the present invention is not limited to this. The effects of the present invention can also be obtained by setting a lens apparatus whose optical axis has a small angle with respect to the vertical direction as the master lens apparatus.

Second Embodiment

An image pickup system according to the second embodiment of the present invention will be described below with reference to FIGS. 4 and 5.

In this embodiment, load distribution of power consumption in power supply to the zoom operating member and the relay box will be explained. In addition, the master/slave switching in the driving direction will be described.

The arrangement of the image pickup system according to this embodiment is the same as in FIG. 1 of the first embodiment, and a description thereof will be omitted.

Figure 4:
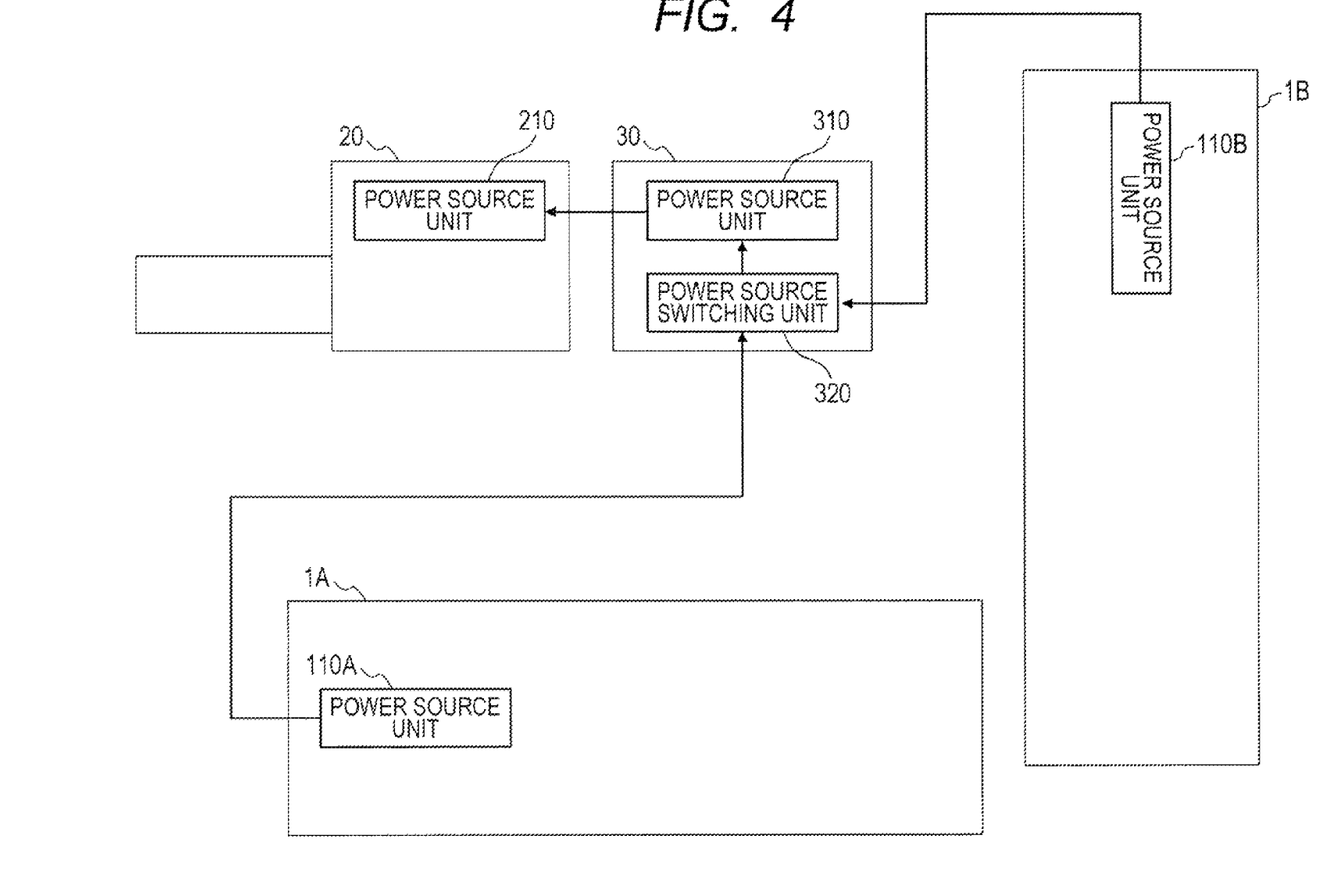
FIG. 4 is a block diagram showing the arrangement of the power source unit of an image pickup system according to the second embodiment of the present invention.

FIG. 4 is a block diagram that extracts only the power source unit of the image pickup system.

The image pickup system includes two lens apparatuses, that is, a lens apparatus 1A and a lens apparatus 1B, a zoom operating member 20, and a relay box 30, any of which does not include an element like a power source such as a battery. Hence, the zoom operating member 20 receives power from the relay box 30, the relay box 30 receives power from the lens apparatus 1A or 1B, and the lens apparatuses 1A and 1B receive power from cameras (not shown) connected to them. Each camera (not shown) includes a power generation source such as a battery. The lens apparatus 1A is in the horizontal state, and the lens apparatus 1B is in the vertical state. Power source units 110A and 110B are connected to a power source switching unit 320 in the relay box 30. The power source switching unit 320 alternatively selects the lens apparatus 1A or 1B and connects it to a power source unit 310 to supply power to the relay box 30. At the time of power-on, an arbitrary lens apparatus is selected as the lens apparatus whose power source is to be connected to the relay box 30.

Each lens apparatus includes a movable optical member such as a zoom lens or focus lens to be driven in the optical axis direction. In a no-operation state (motionless state), the movable optical member is position-controlled to maintain the current position. Hence, when the lens apparatus is in the vertical state, a holding power is applied so as not to move the movable optical member in the direction of gravity, and the power consumption in the motionless state is larger than in the horizontal state. In an operation state (driving state), the power consumption is small at the time of driving in the same direction as the direction of gravity, and large at the time of driving in a direction opposite to the direction of gravity. As described above, the camera uses a power source such as a battery. For this reason, if the lens apparatuses have different power consumptions, the battery in one of them is consumed quickly, and the batteries can hardly be operated appropriately. Hence, the power source switching unit 320 of the relay box 30 is controlled to connect a lens apparatus having a small power consumption to the power source unit 310, and the power is supplied to the relay box 30 and the zoom operating member 20. Details will be described later.

Figure 5:
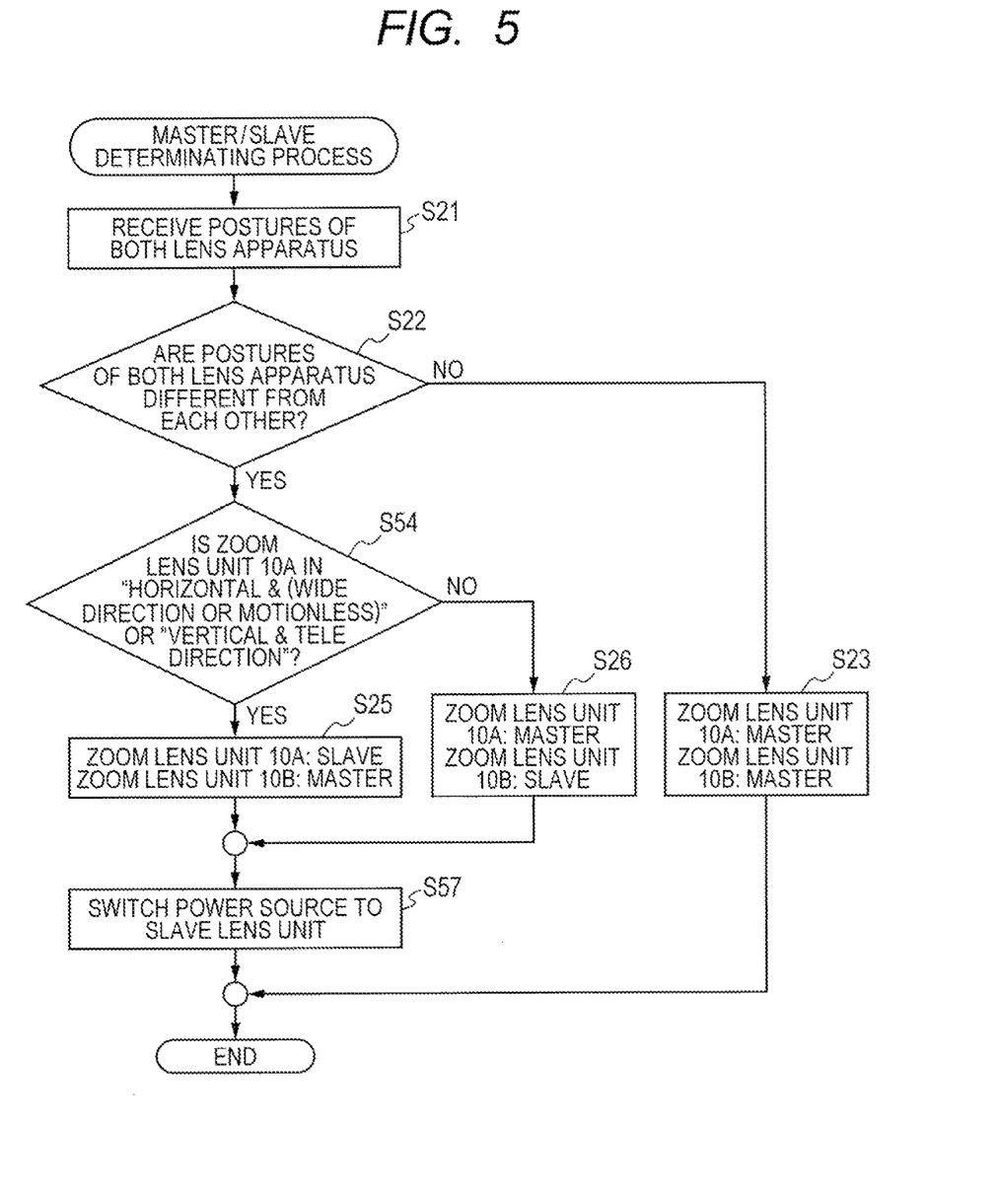
FIG. 5 is a flowchart showing the procedure of a master/slave determining process according to the second embodiment.

FIG. 5 is a flowchart showing the process of causing a synchronization controller 301 to set zoom lens units 10A and 10B as the master and slave.

As described in the first embodiment, when driving the zoom lens unit in the vertical state in a direction opposite to the direction of gravity, the driving speed decreases, and the power consumption increases as compared to the zoom lens unit in the horizontal state. To the contrary, at the time of driving in the same direction as the direction of gravity, the driving speed increases, and the power consumption decreases as compared to the zoom lens unit in the horizontal state. In the second embodiment, an example will be described in which zoom lenses 130A and 130B are set as the master and slave in consideration of the postures and the driving direction to synchronously drive them.

In this embodiment, an example will be described in which the driving direction of the zoom lens unit in the vertical state driven to the wide angle side is the same as the direction of gravity (to be referred to as a wide direction hereinafter), and the driving direction of the zoom lens unit driven to the telephoto side is opposite to the direction of gravity (to be referred to as a tele direction hereinafter).

The same step numbers as in FIG. 2 described in the first embodiment denote the same steps, and a description thereof will be omitted.

In step S54, it is judged whether the zoom lens unit 10A is in the horizontal state and the driving direction of the zoom lens 130A is the wide direction (including the motionless state), or the zoom lens unit 10A is in the vertical state and the driving direction of the zoom lens 130A is the tele direction (not including the motionless state). If the zoom lens unit 10A is in the horizontal state and the driving direction is the wide direction (including the motionless state), or if the zoom lens unit 10A is in the vertical state and the driving direction is the tele direction, the process advances to step S25 to set the zoom lens unit 10B as the master and the zoom lens unit 10A as the slave. Otherwise, the process advances to step S26 to set the zoom lens unit 10A as the master and the zoom lens unit 10B as the slave. When the master/slave determination is completed, the process advances to step S57. In step S57, the power source switching unit 320 is switched to connect the lens apparatus of the slave zoom lens unit to the power source unit of the relay box 30. If the postures are the same in step S22, the process of step S57 is not performed, and the state of power supply from the same lens apparatus as before the start of the procedure of the master/slave determining process is maintained.

A communication process of a command signal for instructing driving of the zoom lenses 130A and 130B is the same as the process described with reference to FIG. 3 of the first embodiment.

As described above, when the driving direction is the same as the direction of gravity, the zoom lens unit in the horizontal state is set as the master zoom lens unit. When the driving direction is opposite to the direction of gravity, the zoom lens unit in the vertical state is set as the master zoom lens unit. Hence, the zoom lens unit having a low driving speed is always set as the master independently of the driving direction. It is therefore possible to maintain the synchronization even during driving. In addition, at the time of driving, the lens apparatus having a high driving speed (small power consumption) is set as the slave zoom lens unit. In the motionless state, the lens apparatus having a small holding power (small power consumption) is set as the slave zoom lens unit. Hence, the load of the power consumption is distributed by supplying power from the lens apparatus of the slave zoom lens unit. The difference in the power consumption between the two lens apparatuses 1A and 1B can always be made small.

In this embodiment, the process of switching the power source by setting the master zoom lens unit and slave zoom lens unit has been described. However, the present invention is not limited to this. For example, since the movable optical members are motionless for a longer time, the power source may be switched based on only the posture.

Third Embodiment

An image pickup system according to the third embodiment of the present invention will be described below with reference to FIGS. 6 and 7.

In this embodiment, an example in which the driving load in the zoom driving range varies in the vertical state will be described.

The arrangement of the image pickup system according to this embodiment is the same as in FIG. 1 of the first embodiment, and a description thereof will be omitted.

Figure 6:
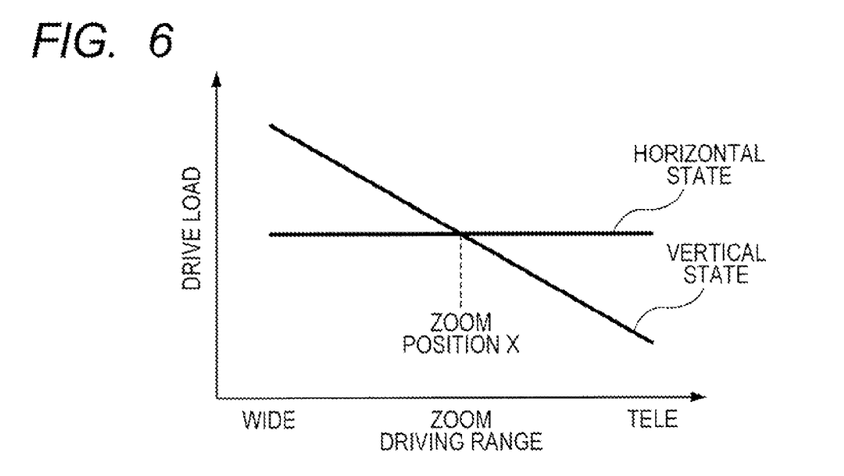
FIG. 6 is a graph showing the driving load in a zoom driving range according to the third embodiment.

FIG. 6 is a graph showing an example of the driving load in the zoom lens throughout the zoom driving range.

In the horizontal state, the driving load has an almost constant value throughout the zoom driving range. In the vertical state, the zoom driving range includes a zoom driving range where the driving load is larger than in the horizontal state and a zoom driving range where the driving load is smaller than in the horizontal state. As for the zoom lens unit described in the first or second embodiment, the driving load is small in the vertical state at the time of driving in the same direction as the direction of gravity. At the time of driving in the direction opposite to the direction of gravity, the driving load increases. However, the driving load has an almost constant value throughout the zoom driving range. However, the driving load may vary in the zoom driving range, as shown in FIG. 6, depending on the manner the cam mechanism for driving zoom lenses 130A and 130B is grooved. Hence, in this embodiment, an example will be described in which the driving load data in FIG. 6 is held, and the master and slave are selected in consideration of the data of the driving load.

Figure 7:
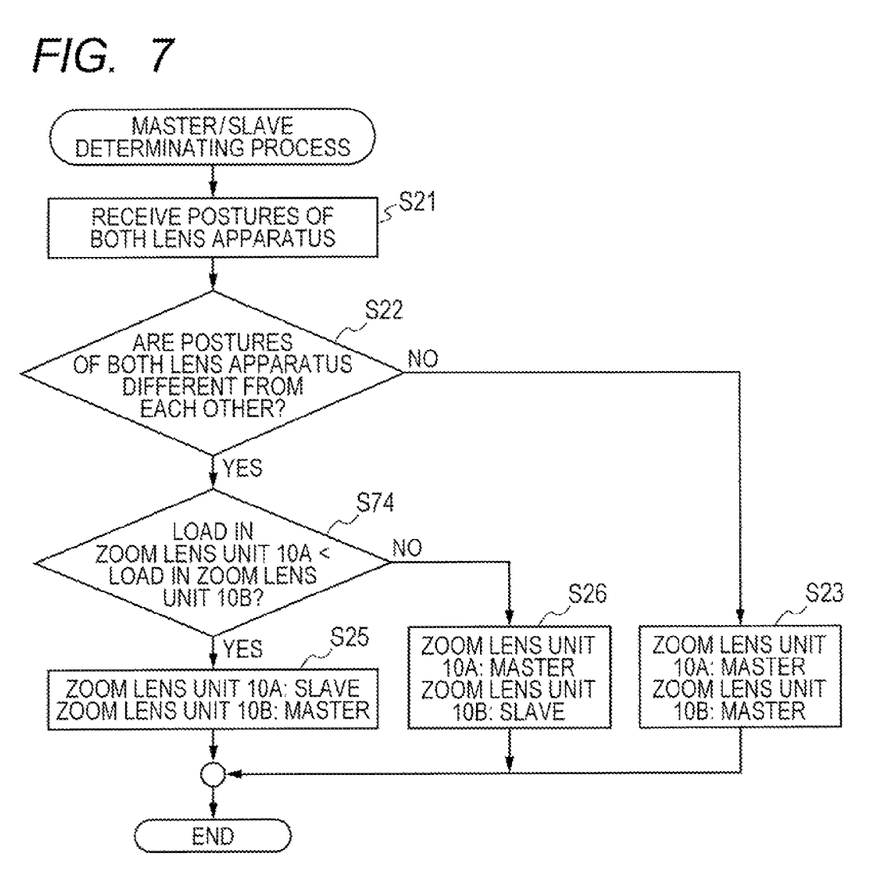
FIG. 7 is a flowchart showing the procedure of a master/slave determining process according to the third embodiment.

FIG. 7 is a flowchart showing the process of causing a synchronization controller 301 to set zoom lens units 10A and 10B as the master and slave.

The same step numbers as in FIG. 2 described in the first embodiment denote the same steps, and a description thereof will be omitted.

In step S74, using the driving load data held in advance shown in FIG. 6, it is judged by referring to the driving load at the current positions of the zoom lenses 130A and 130B whether the driving load in the zoom lens unit 10B in the vertical state is larger than that in the zoom lens unit 10A in the horizontal state. If the driving load in the zoom lens unit 10B is larger, the process advances to step S25 to set the zoom lens unit 10B as the master zoom lens unit. If the driving load in the zoom lens unit 10B is smaller, the process advances to step S26 to set the zoom lens unit 10A as the master zoom lens unit.

Driving characteristic data like the driving load data (or power consumption data) shown in FIG. 6 may be held as an approximation formula, or driving load values as many as an arbitrary number of samples may be held. Alternatively, a zoom position X where the magnitude relationship of the driving load changes may be held.

A communication process of a command signal for instructing driving of the zoom lenses 130A and 130B is the same as the process described with reference to FIG. 3 of the first embodiment.

As described above, even when the driving load varies in the zoom driving range, the zoom lens unit having a low driving speed (large driving load or large power consumption) is always set as the master zoom lens unit. It is therefore possible to maintain the synchronization even during driving.

In this embodiment as well, setting may be done to supply power from the zoom lens unit to the relay box or zoom operating member, as in the second embodiment. This allows to supply power from the lens apparatus side where the power consumption is small, uniform the power load, and make the power consumption difference between the two lens apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-116448, filed May 22, 2012, which is hereby incorporated by reference herein in its entirety.

What is claimed is:

1. An image pickup system, comprising:
   two lens apparatuses each including a movable optical member, a driving unit that drives the movable optical member, and a driving signal generating unit that generates a driving signal for causing the driving unit to drive the movable optical member;
   a command signal generating unit that generates a command signal to command driving of the movable optical member;
   a posture determining unit that determines a posture of each of the two lens apparatuses; and
   a master-slave setting unit that sets each of the lens apparatuses, based on the posture of the lens apparatus determined by the posture determining unit, as one of a master lens apparatus in which the driving signal generating unit generates the driving signal based on the command signal and a slave lens apparatus in which the driving signal generating unit generates the driving signal based on a position of the movable optical member in the other lens apparatus.

2. The image pickup system according to claim 1, wherein the master-slave setting unit sets the lens apparatus whose optical axis direction is determined to be a vertical direction by the posture determining unit as the master lens apparatus and the lens apparatus whose optical axis direction is determined to be a horizontal direction as the slave lens apparatus.

3. The image pickup system according to claim 1, wherein if the two lens apparatuses have the same posture determined by the posture determining unit, the master-slave setting unit sets both lens apparatuses as the master lens apparatuses.

4. The image pickup system according to claim 1, wherein the master-slave setting unit sets the master lens apparatus and the slave lens apparatus based on the posture determined by the posture determining unit and a driving direction of the movable optical member.

5. The image pickup system according to claim 1, wherein the master-slave setting unit sets the master lens apparatus or the slave lens apparatus based on the posture determined by the posture determining unit and the position of the movable optical member.

6. The image pickup system according to claim 5, wherein the master-slave setting unit sets the master lens apparatus or the slave lens apparatus based on the posture determined by the posture determining unit, the position of the movable optical member, and driving characteristic data in a horizontal state and a vertical state of the movable optical member.

7. The image pickup system according to claim 1, comprising:
   an operating apparatus operated by a user and including the command signal generating unit; and
   a connection apparatus that connects the two lens apparatuses and the operating apparatus,
   wherein each of the two lens apparatuses comprises the posture determining unit, and
   the master-slave setting unit is included in one of the lens apparatuses, the operating apparatus, and the connection apparatus.

8. The image pickup system according to claim 7, comprising a power source switching unit that switches connection to supply power from one of the two lens apparatuses to the operating apparatus and the connection apparatus based on setting by the master-slave setting unit.

9. The image pickup system according to claim 8, wherein when one of the two lens apparatuses is the slave lens apparatus, the power source switching unit switches the connection to supply the power from the slave lens apparatus to the operating apparatus and the connection apparatus.

10. The image pickup system according to claim 1, wherein the command signal generating unit generates a command signal for the movable optical member of the master lens apparatus,
   wherein based on a position of the movable optical member in the master lens apparatus, the command signal generating unit generates the command signal for the movable optical member in the slave lens apparatus.

11. A controller that controls two lens apparatuses each including a movable optical member, comprising a command signal generating unit that generates a command signal for the movable optical member of one of the two lens apparatuses in accordance with postures of the two lens apparatuses,
    wherein based on a position of the movable optical member in one lens apparatus, the command signal generating unit generates the command signal for the movable optical member in the other lens apparatus.

* * * * *